G. A. CUTTER.
POWER TRANSMISSION DEVICE.
APPLICATION FILED JULY 24, 1905.
949,265.
Patented Feb. 15, 1910.
3 SHEETS—SHEET 3.
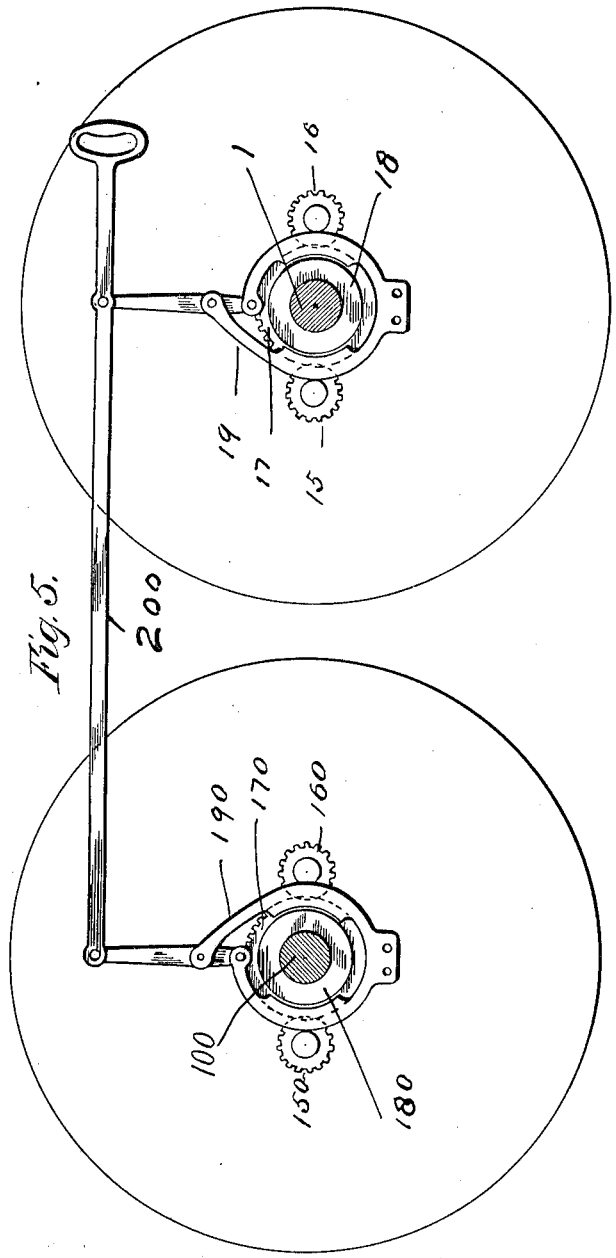
Witnesses:
F. H. Elliott.
Inventor.
George A. Cutter

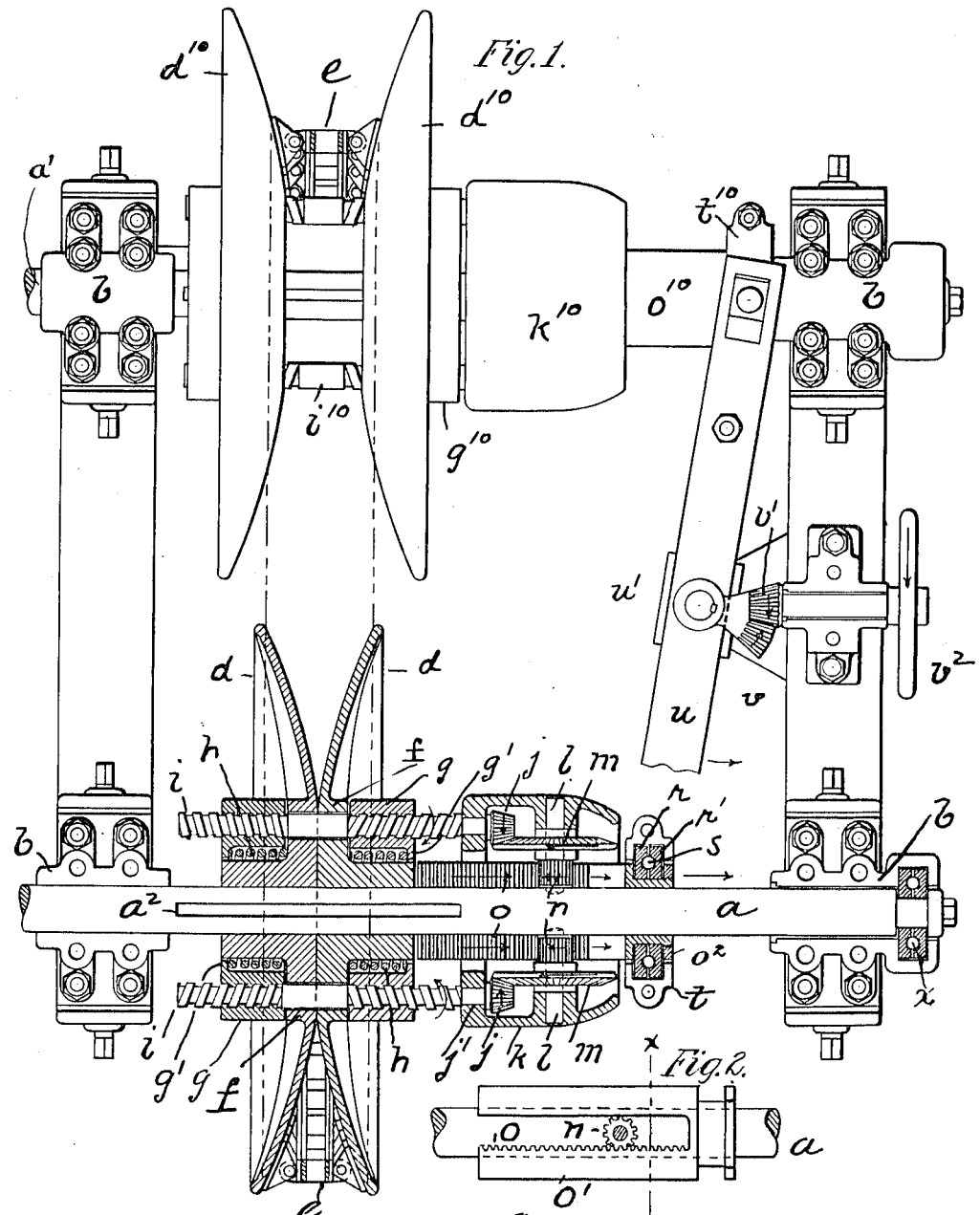

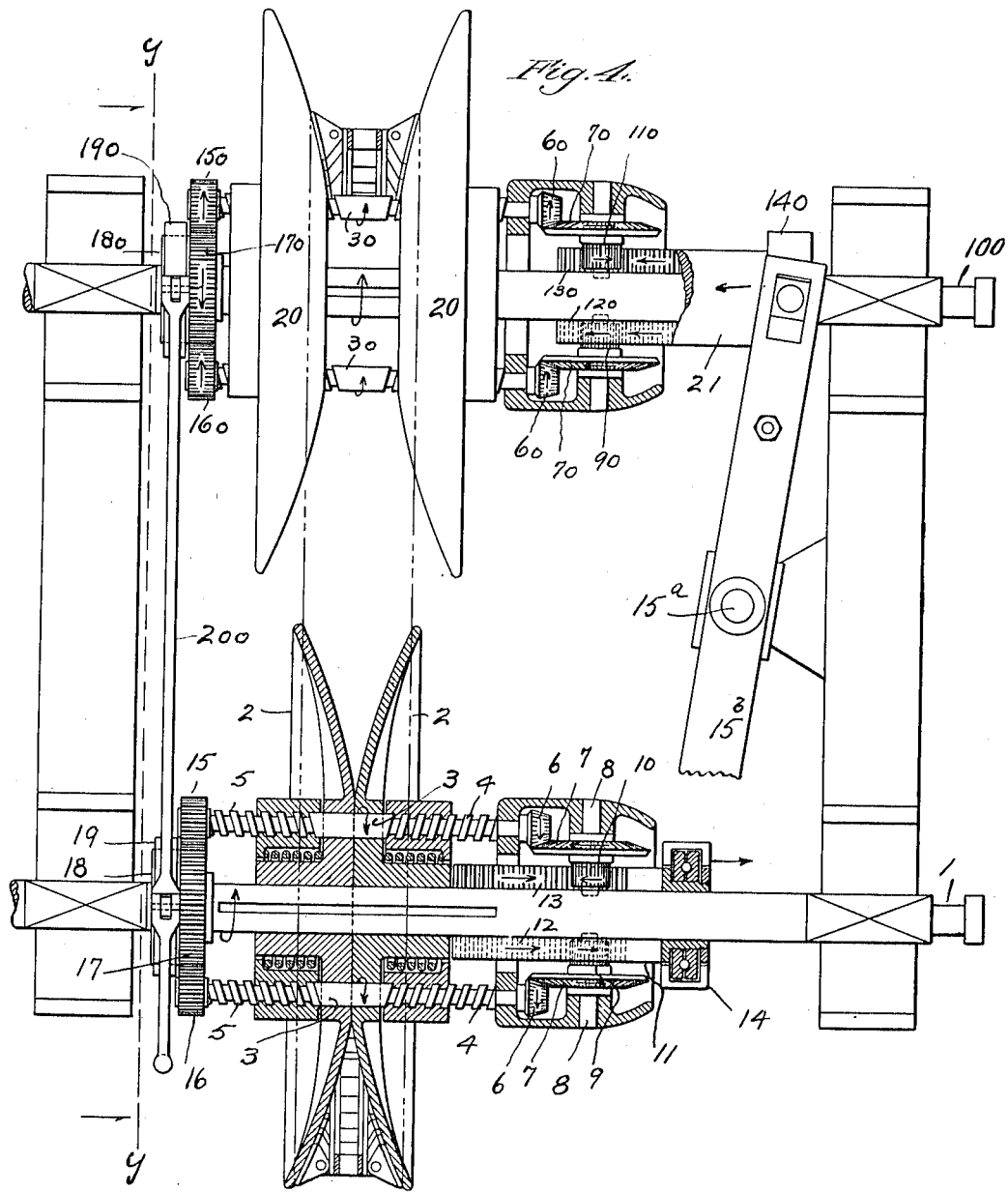

UNITED STATES PATENT OFFICE.

GEORGE A. CUTTER, OF NEWTON HIGHLANDS, MASSACHUSETTS.

POWER-TRANSMISSION DEVICE.

949,265.   Specification of Letters Patent.   Patented Feb. 15, 1910.

Application filed July 24, 1905. Serial No. 270,900.

*To all whom it may concern:*

Be it known that I, GEORGE A. CUTTER, a citizen of the United States of America, residing at Newton Highlands, in the county of Middlesex and State of Massachusetts, have invented certain new and useful Improvements in Power-Transmission Devices, of which the following is a specification.

My invention relates to variable speed power transmission devices of the class in which one of the pulleys is composed of a pair of disks at least one of which is slidingly mounted on the shaft. The edges of the driving belt contact with these disks and its driving diameter is changed by changing the distance between the disks.

In the embodiment of my invention illustrated both of the pulleys are made up as above described and all disks are arranged to slide on the shaft, but my invention, which provides a novel method of moving the disks along the shaft, is applicable as well to a case where but one pulley and one member of the pulley is adjustable, as to a case where there is duplication of these features. Furthermore, I provide a novel means for maintaining an even tension on the belt at all driving diameters of the pulleys.

In the drawings—Figure 1 is a general plan view illustrating an embodiment of my invention in which the parts are moved by hand, the parts being shown in central section on one shaft to illustrate the construction. Fig. 2 is a detail side elevation of the gear connections. Fig. 3 is an end section on the line $x$—$x$ of Fig. 2. Fig. 4 shows in plan and partly in section an embodiment of the invention which the disk-moving mechanism is actuated by power derived from the shaft. Fig. 5 is a detail side elevation of the mechanism illustrated in Fig. 4, taken on the line $y$—$y$ and looking in the direction of the arrow, illustrating the brakes and connections. Fig. 6 is an end section of the shaft and rack sleeve showing the gear connections.

Referring to the embodiment of Fig. 1 of the drawings $a$ $a'$ are the shafts, one of which, $a'$, may be considered as having a constant rate of rotation, the other, $a$, being driven from $a'$ at varying speeds. These shafts are mounted in suitable bearings which are indicated at $b$.

$d^{10}$ $d^{10}$ are the disks on the driving shaft and $d$ $d$ are the disks on the driven shaft, they being connected by a suitable belt, indicated at $e$. Each of these disks is connected with its shaft by splines, as indicated at $a^2$ so that they will revolve with it, but in the embodiment of the invention shown in the drawings the disks of each pair are adapted for movement lengthwise of the shaft. These disks have hubs $f$ and collars $g$, which are shouldered as at $g'$, forming recesses in which are located stiff spiral springs $h$ for purposes which will be hereinafter described. So far as the moving of the disks goes the collars can be considered as integral parts of the hubs. Screws $i$ pass through the hubs and are threaded into the collars with right and left hand threads, as indicated, so that rotation of the screws in one direction will permit the disks to be moved apart by the pressure of the belt and in the reverse direction will draw them together. On one end of each screw there is mounted a beveled pinion $j$ which has a bearing at $j'$ in a bonnet $k$ which revolves with the shaft. Studs $l$, supported at one end in the bonnet and at the other end in the shaft, carry beveled gears $m$ which mesh with the beveled pinions on the ends of the screws; these studs also carry spur pinions $n$ which mesh with racks $o$ which are carried by the shaft so that they will rotate with it but may be moved lengthwise of it. On the outer end of the sleeve $o'$, in which the racks are cut, are mounted ball races $r$ $r'$ between which are located the balls $s$. A nut $o^2$ at the outer end of the sleeve $o'$ holds the ball races on the sleeve. These ball races are inclosed by a yoke collar $t$, which is connected with a shifting lever $u$, which is suitably mounted as at $u'$ and carries a beveled gear segment $v$ which is engaged by the beveled pinion $v'$ turned by the hand wheel $v^2$. It is to be understood that the shaft $a'$ is equipped with the same character of shifting devices, the disks being indicated at $d^{10}$, the screws at $i^{10}$, the nut collars at $g^{10}$, the bonnet at $k^{10}$, the rack sleeve at $o^{10}$, and the yoke at $t^{10}$, and that the ends of the shifting lever $u$ are connected with the yoke collars $t$ $t^{10}$.

The device operates in the following manner, it being understood that all parts except the yokes rotate with the shaft. A turn of the hand wheel $v^2$ to the left will swing the shifting lever $u$, causing the yoke $t$ to move outwardly away from the bonnet. The inner flange of the yoke engages the ball race $r$ and through the balls the race $r'$, which brings up against the nut $o^2$ and so causes the rack sleeve $o'$ and racks $o$ to move outwardly with the yoke. This outward movement of the racks, as indicated by the arrow, will cause the rotation of the spur pinions $n$, the beveled gears $m$, the beveled pinions $j$ and the screws $i$ in the directions indicated by the arrows, permitting the disks $d\ d$ to move apart. On the shaft $a'$ this same movement of the hand wheel $v^2$ moves the rack sleeve and the racks inwardly, causing the gears and the screws to rotate in the opposite directions from those on the shaft $a$, thus drawing the disks $d^{10}\ d^{10}$ together. It is seen that during this shifting movement of the disks the thrust of the disks is taken by the ball bearings $s$ and the thrust of the shaft is taken up by the ball bearings indicated at $x$ at the end of the shaft. As soon as the disks have been moved to the desired position of adjustment the pressure of the belt tending to separate the disks is exerted on the threads of the screws $i$, and, as is clearly seen, this end thrust of the disks is not transmitted by the screws to other parts. Consequently, as soon as this adjustment is attained and the device resumes its normal operation the end thrust on the shifting mechanism, in this case the yoke, is entirely relieved.

For many reasons the relief of the shifting devices from a continuous pressure exerted by the end thrust of the disks is decidedly advantageous.

Another feature of my invention resides in the automatically operating means for maintaining an even tension on the belt for all diameters of the driving pulleys. As will be noted from the above description the screws $i$ are threaded into the nut collars $g$ and motion is transmitted to the disks through the springs $h$. It will also be noted that there is a slight clearance between the inner ends of the nut collars and the hubs of the disks. As the screws $i$ are turned to draw the nut collars together the movement of these collars is transmitted through the springs $h$ to the disks $d\ d$. Thus the disks are permitted a slight longitudinal movement with respect to the collars and are supported by the stiff springs $h$, thus permitting the belt to accommodate itself to the different conditions and maintain it at an even tension.

Fig. 4 shows a method of operating the sliding disks by power derived from the driving shaft, and this is the only respect in which it differs from the device illustrated in the first three figures above described. 100 denotes the driving shaft and 1 the driven shaft. The disks are denoted by the numerals 2—2 and 20—20. They are mounted to slide on their shafts and their hubs are threaded to receive the screws 3—3 and 30—30. It will be noted that the threads 4—4 are both left hand threads and 5—5 are right hand threads. The screws 3—3 carry the beveled pinions 6—6, meshing with the beveled gears 7—7, which are mounted on stud shafts 8—8, which also carry the spur pinions 9—10. On the rack sleeve 11 are cut two racks 12—13, and it will be noted that these racks are diagonally opposite one another so that the rack 12 meshes with the upper side of the pinion 9 while the rack 13 meshes with the under side of the pinion 10. The rack sleeve is connected with the collar 14 which in turn is connected with one end of the lever $15^b$, which is pivoted as at $15^a$, its opposite end being connected with the collar 140 on the driving shaft 100. The screws 30—30 are provided with beveled pinions 60—60, beveled gears 70—70, spur pinions 90—110 and racks 120—130 cut in a rack sleeve 21 which has the collar 140 to which the lever $15^b$ is secured. The arrangement of these parts is similar to the arrangement of the corresponding parts on the shaft 1. On the outer ends of the screws 3—3, 30—30 are spur pinions 15—16, 150—160, which mesh with the spur gears 17—170, respectively, which are loosely mounted on the shafts 1—100, respectively. These spur gears have hubs 18—180 and oppositely arranged brakes 19—190 are mounted on these hubs and are connected to a common brake rod 200 in such manner that a motion of the brake rod in one direction will apply one brake and motion in the other direction will apply the other brake, it being impossible to apply both brakes at the same time.

The operation of this device is as follows, assuming the parts to be in the positions shown in Fig. 4, where the shaft 1 is being driven at its lowest speed. To increase the speed of the shaft 1 it is necessary to decrease the driving diameter of its pulley by separating the disks 2—2 and increase the driving diameter of pulley on the driving shaft 100 by moving the disks 20—20 together. To accomplish this result power taken from the driving shaft 100 is utilized to draw the disks 20—20 together, and through the gear and rack devices and the lever $15^b$ connecting with the gear and rack devices on the driven shaft 1 the disks 2—2 are permitted to be moved apart. The driving shaft 100 rotates in the direction of the arrow and under normal conditions the gear 170 rotates with it. By applying the brake 190 to the hub 180 of the gear 170 it is caused to lag behind the shaft 100 or in effect to rotate in the opposite direction, as indicated by the arrow, and the pinions 150—160 revolve about it, rotating in the directions indicated by the arrows, causing the rotation of the screws 30—30 in the directions indicated by the arrows. This rotation of these screws as is clearly apparent will cause the disks 20—20 to move together. The movement of the screws 30—30 is communicated through the beveled pinions 60—60, beveled gears 70—70 and spur pinions 90—110 to the racks 120—130, all of the parts moving in the directions indicated by the arrows to carry the collar 140 inwardly along the shaft 100. This inward movement of the collar 140 causes an outward movement of the collar 14 on the driven shaft 1 through the pivoted lever 15$^b$, and the outward movement of the collar 14 acting through the racks 12, 13, spur pinions 9—10 and beveled gear connections 6—7, arranged similar to those on the shaft 100, causes the rotation of the screws 3—3 in the direction indicated by the arrows, this direction of rotation permitting the disks 2—2 to recede from one another. When the proper change of speed is obtained the brake is released, leaving the gear 170 free to rotate with the shaft 100.

Let it now be assumed that by the operation described the disks 2—2 have been separated to the limit and the disks 20—20 moved together, under which condition the shaft 1 is driven at its greatest speed. Now if it be desired to reduce the speed of the shaft 1 the brake rod 200 is moved to set the brake 19 onto the hub 18 of the gear 17. The direction of rotation and movement of all of the parts beginning with the screws 3—3 and including the beveled gears and racks and pinions on the shaft 1, the lever 15$^b$ and the racks and pinions and beveled gears on the shaft 100 and the screws 30—30 is now exactly the reverse of the directions of movements indicated by the arrows, and the disks 2—2 will be moved together, the collar 14 will be moved in on the shaft 1, the collar 140 will be moved out on the shaft 100 and the disks 20—20 will be moved apart. In changing the speed ratio the heavy duty comes in increasing the driving diameter of one of the pulleys by forcing the disks together, which is accomplished of course by rotating the screws in the proper direction. By the arrangement of my device the power from the shaft is applied directly to rotating the screws to force these disks together and then through the connection with the other shaft the screws engaging the other pair of disks are rotated to permit the disks to separate. It is clear that in this arrangement as well as in the construction illustrated in Figs. 1 to 3 the disks cannot be separated for the purpose of varying the speed under any pressure which they are subjected to by the belt, they being movable only when some means is applied to turn the screws. This provision for operating the disks by power is extremely convenient, particularly in cases where the device is subjected to heavy duty.

I claim:—

1. The combination in a power transmission device with the shafts and pulleys thereon, the pulley on one shaft being made up of elements at least one of which is capable of sliding movement toward or away from the other to vary its driving diameter, of a lever, and positive connections between said element and said lever whereby the movement of said lever causes said element to slide on its shaft, said connections including a pair of rotary parts having a threaded engagement with said sliding element.

2. The combination in a power transmission device with the shafts and pulleys thereon, the pulley on one shaft being made up of disks at least one of which is capable of movement toward or away from the other to vary its driving diameter, of means, operative independently of said shaft, for causing the movement of said disk, comprising mechanism rotatably secured to said shaft and which is inoperative under pressure exerted by the disk, said mechanism including a rotatable part having threaded engagement with said movable disk, and a lever for actuating said mechanism.

3. In a variable speed power transmission device the combination with the shafts, and pulleys mounted therein, one of which is made up of a pair of disks one of which is mounted to slide along its shaft, of means for moving said disk comprising an actuating lever, and connections rotatably secured to said shaft between said lever and said disk and operative independently of said shaft, said connections including a part supported by said pulley and adapted to positively transmit power from said lever to said disk to move it along the shaft but inoperative under pressure exerted by said disk.

4. In a power transmission device the shafts, pulleys thereon each made up of separate elements, screw threaded bars engaging the hubs of the elements of said pulleys to move them lengthwise of said shafts, racks mounted to slide along said shafts, connections between the racks and threaded bars to cause rotation of the latter upon the movement of the former, and means for moving said racks.

5. In a variable speed power transmission device the combination with the shafts, and pulleys mounted thereon, one pulley being made up of a pair of disks with a belt groove between them and at least one of which is mounted to slide along the shaft, of means for moving said disks comprising an actuating lever, and connections between said lever and said disk, said connections being operative independently of the shaft and adapted to transmit power from said lever to said disks to move them along the shaft but inoperative under pressure exerted by said disks, said connections including a member supported by said pulley.

6. In a variable speed power transmission device the combination with the shafts, and pulleys mounted thereon, said pulleys being made up of pairs of disks with a belt groove between them, one of which disks is mounted to slide on its shaft, of means for moving said sliding disk comprising a screw having threaded connection with said disk, an actuating lever, and connections between said screw and lever operative independently of the shafts for rotating the former.

7. In a variable speed power transmission device the combination with the shafts and pulleys mounted thereon, said pulleys being made up of pairs of disks mounted to slide on the shafts, of means for sliding said disks comprising screws having right and left hand threads engaging corresponding threaded parts connected with the disks, an actuating lever, and connections between said screws and lever operative independently of the shafts for rotating the former, as and for the purposes specified.

8. In a variable speed power transmission device the combination with the shafts, and the pulleys mounted thereon, said pulleys being made up of pairs of disks mounted to slide on the shafts, of screws having one a right and the other a left hand thread and operatively connected with one of said disks, beveled pinions on said screws, beveled gears meshing therewith, spur pinions mounted on said beveled gear studs, racks meshing with said spur-pinions and sliding along the shaft, a lever, and connections between it and said racks, all substantially as described and for the purposes set forth.

9. In a variable speed power transmission device the shafts, pulleys formed from pairs of disks slidingly mounted thereon, said disks having shouldered hubs, recessed nut collars fitting on said hubs against the shoulders forming therewith chambers, springs located in said chambers, an actuating lever, and connections between said lever and said nut collar operative independently of the shafts for moving said disks through said springs, substantially as described and for the purposes set forth.

10. In a power transmission device the shafts, pulleys thereon, one of said pulleys being made up of elements at least one of which slides along the shaft, one or more threaded bars connected with the hub of the movable element to slide it, and means for rotating said bars comprising a gear loosely mounted on the shaft and normally rotating with it, pinions on the bars in engagement with said gear, and means for retarding the rotary speed of said gear.

11. In a power transmission device the shafts, separable pulleys thereon, threaded bars connected with the hubs of the elements of said pulleys to move them lengthwise of the shafts, racks slidingly mounted on the shafts and having rotary driving connections with said threaded bars, gears loosely mounted on said shafts, pinions on said bars in mesh therewith, brakes for said gears, and a centrally pivoted lever connecting said racks.

12. The combination in a variable speed power transmission device with the shafts and pulleys thereon, said pulleys being made up of elements at least one of which in each pulley is adapted to slide along its shaft toward or away from its coöperating element, of means arranged in connection with and operated by either shaft for moving the sliding element of the pulley thereon toward its coöperating element, and means connected with and operated by said means for moving the sliding disk of the pulley on the other shaft away from its coöperating element, as and for the purposes specified.

13. In a variable speed power transmission device the shafts, pulleys mounted on each shaft, said pulleys being made up of elements adapted to slide toward and away from each other, bars each having right and left hand threads which engage the elements of each pulley, means for causing the rotation of said bars, a lever having its end secured to said means on each shaft and pivoted at a point between its ends, and devices for connecting the threaded bars of either pulley to its shaft, whereby when the connection between the bars of one pulley and its shaft is made said bars are caused to revolve moving the elements of said pulley toward each other and the bars of the other pulley are revolved to move the elements of said pulley in a direction opposite to the direction of movement of the elements of the first mentioned pulley, substantially as described.

14. In a variable speed power transmission device, the shafts, pulleys on each shaft made up of pairs of disks, one of each pair being slidingly mounted on its shaft, means for transmitting power from either shaft to shift its movable disk toward the other, and connections between the movable disks on each shaft operative independently of said shafts whereby the movement of one disk by the power from its shaft will cause the movement of the other disk but in the opposite direction.

15. In a variable speed power transmission device in combination with two shafts and the belt, pulleys mounted on the shafts, each pulley being made up of a pair of disks one of each pair being adapted to slide on its shaft to vary the driving diameters of the pulleys; threaded bars engaging the movable disks; shifting mechanism on said shaft rotatable with but operative independently thereof for turning said threaded bars to move said disks; a pivoted lever having its end connected with said mechanism on each shaft so that movement of the mechanism on one shaft in one direction will cause the movement of the mechanism on the other shaft in the opposite direction; and means for applying power from either shaft to the threaded bars of its movable disk to cause the movement of said disk in one direction and, through the shifting mechanism on each shaft and the lever, the movement of the disk of the other shaft in the opposite direction, said means being operative on only one shaft at a time.

16. The combination in a variable speed power transmission device with the shafts and pulleys thereon, each pulley being made up of elements one of which is adapted to slide along its shaft toward or away from its coöperating element to vary the diameter of said pulley, of a plurality of bars in threaded engagement with the movable element of each pulley, means operated by a shaft for rotating the bars connected with the movable element of the pulley thereon, and mechanism connected with and operated by the rotation of said bars for rotating the bars connected with the movable element of the pulley on the other shaft, as and for the purposes specified.

In testimony whereof I affix my signature in presence of two witnesses.

GEORGE A. CUTTER.

Witnesses:
WATSON G. CUTTER,
BESSIE T. HALL.